Nov. 10, 1931.  R. RICHTER ET AL  1,830,767
COMMUTATED COMPENSATION WINDING
Filed Dec. 10, 1927
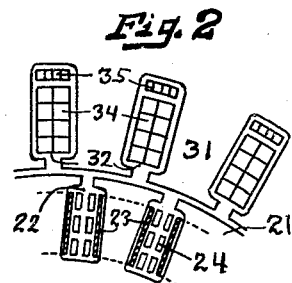
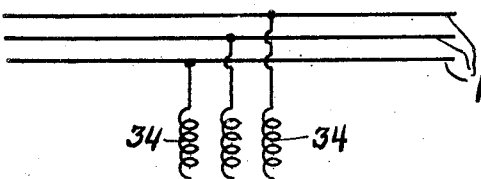
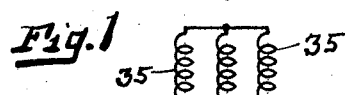
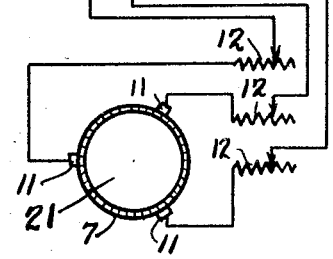
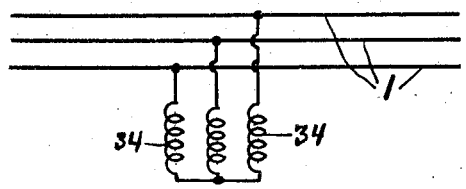
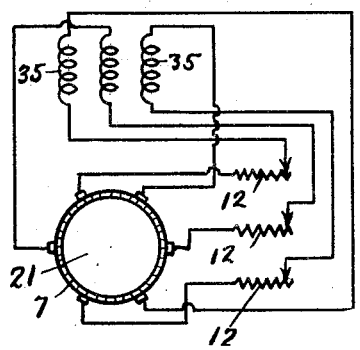
INVENTORS
Rudolf Richter
& Alexander Fekete
By Otto Ratz
ATTORNEY Patented Nov. 10, 1931

1,830,767

UNITED STATES PATENT OFFICE

RUDOLF RICHTER, OF DURLACH, GERMANY, AND ALEXANDER FEKETE, OF MILAN, ITALY, ASSIGNORS TO RADIO PATENTS CORPORATION, OF NEW YORK, N. Y., A CORPORATION OF NEW YORK

COMMUTATED COMPENSATION WINDING

Application filed December 10, 1927, Serial No. 239,214, and in Italy December 22, 1926.

The well-known compensation of three-phase motors according to the method of Heyland is subject to the disadvantage that two separate windings are required in the rotor. One of the windings is a working winding and is short circuited, e. g., it may be a squirrel cage winding. The other is a commutator winding and is connected through the commutator brushes to a special exciting-winding in the stator.

In the larger sizes the squirrel cage winding (working winding) must be replaced by a three-phase winding connected with three slip rings leading to a starting resistance. This arrangement has the disadvantage that the slot space of the rotor cannot be efficiently utilized. It is further subject to the complication of having slip-rings in addition to a commutator.

To overcome the above noted disadvantages it has been proposed to use the commutator-winding as a working winding and incidentally as a starting winding.

The new starting arrangement includes a series rheostat between the exciting winding and the brushes of the commutator winding. This rheostat is gradually short-circuited as the starting progresses and the motor continues to work as a shunt commutator motor.

It has been found, however, that a motor of this nature could not be used satisfactorily in practice, owing to the existence of heavy sparking of the commutator. This is due to the heavy current to be carried by the commutator segments and brushes and in order to keep the sparking within reasonable limits it would be necessary to provide a comparatively large commutator, which, however, would make a motor of this kind impracticable and uneconomical. The main object of this invention consists in providing means in connection with a motor of the type as described for suppressing excessive sparking at the commutator brushes and, at the same time, for relieving the rotor winding of the motor from the heavy operating currents, which again will reduce the production of commutator sparking and thus enable the use of a smaller commutator.

For reducing the reactive fields of the commutated winding we have short circuit copper bands in the form of thin rings around the teeth of the rotor. These bands help also to increase the torque of the motor, and act also without resistance as a short circuited rotor-winding.

This method of compensation is the simplest of all used with motors of this kind, because the heating of the rotor is only the half of the heating of the rotor of all other compensated motors. Without changing the mechanical parts of a normal A. C. motor, we can make out of it a motor of this kind, from sizes as small as $\frac{1}{10}$ H. P.

The little motors of $\frac{1}{10}$ H. P. have normally the worst power factor and no remedy has heretofore been produced for improving it. For such little motors we can now use the hereindisclosed type of compensation.

The drawings do not show all possible modifications and the invention is intended to be limited only by the scope of the claims.

In the drawings—

Fig. 1 is a wiring diagram showing only those parts of a motor that are affected by the application of this invention, one of said parts being a three-brush commutator;

Fig. 2 is a cross section taken across several of the slots of the stator and rotor of a motor having connections as indicated in Fig. 1;

Fig. 3 is a diagram similar to that of Fig. 1, showing how the wiring would be arranged for the use of a six-brush commutator.

In Fig. 1 the source of power is indicated by the three phase lines 1. The rotor of the motor is indicated at 21 and this rotor is provided with a commutator 7. The stator windings are designated by numerals 34 and 35 and these windings are related to each other to a certain extent as are the primary and secondary of a transformer, the secondary 35 acting as an exciting winding for the rotor. The winding 35 need not be separate from 34, but may be a fraction of said winding, similar to an auto transformer. Referring to Fig. 2, the principal winding in the stator is seen to be 34 supplied with the line voltage. The winding 35 is an excitor winding, is not connected to the lines 1 and derives its current from association with the winding 34 after the manner of the secondary of a transformer.

To start the motor the resistances 12, shown in Fig. 1, are cut in between the brushes 11 of the commutator 7 and the exciting winding 35 of the stator. The winding 21 serves as the compensation winding of the motor, and also as the working winding. This starting with or in some sizes starting without resistance is the principal difference of this type of motor from the customary types, obviating as it does the necessity of a separate working winding, the consequent complication and the increase in losses due to the subdivision of currents.

It is evident that such a construction cannot be applied without necessitating some remedy to maintain good commutation. This is accomplished by a very ingenious means. Windings 23 are applied as short circuit around the teeth of the rotor as shown in Fig. 2. The windings 23 are composed of thin, bare copper-ribbons, with a thickness of some tenth of a millimeter. These ribbons annul almost the whole leakage-flux of the slots so as to guarantee a good commutation. During the starting these short-circuits have the effect of a squirrel cage with a great resistance, so as to develop a moderate torque with small starting current, when the rotor-circuit is open, saving in larger sizes the use of resistance in the commutator circuit.

In this manner the electric short circuit strips surrounding the individual rotor teeth have a double effect on the operation of the motor, which is, of course, more than a mere addition of the action on the leakage flux threading the rotor slots and which is, to a degree, responsible for the production of sparks during commutation. These electric short circuits, as pointed out, have the further effect of relieving the rotor winding from the comparatively heavy operating currents, by producing, especially during the starting period, an additional mechanical torque, whereby, furthermore, indirectly a decrease of the commutator sparking is obtained, owing to the decrease of the currents to be carried by the rotor winding and, accordingly, by the commutator segments and brushes. This is especially of importance during the starting periods of the motor, during which the voltage induced in the rotor winding assumes very high values, as compared to the normal operating voltage induced during the operating condition. This is due, as is well known, to the very large slip of the rotor in respect to the stator field during starting and it is especially this period of operation in respect to which the commutator has to be designed.

To regulate the necessary starting torque, there is the above-mentioned starting resistance 12. During the working the short circuit copper ribbons 23 absorb only a very small part of the line-current.

In order to increase the efficiency of the three-phase winding with a winding factor 0.825 used with the three brush commutator, a "six brush arrangement" can be substituted such as that represented in Fig. 3.

The commutator-winding is utilized in the same way as the simpler three-phase winding.

It will be seen that the exciting winding 35 is connected diametrically to the six brushes. Only three starting rheostats are however required. Also owing to the use of diametrical connection the winding factor is 1, and the current flow in the rotor is such as to bring the losses to a minimum.

In order to compare the copper losses in the rotor with those of the arrangement heretofore used, we may suppose that for the old arrangement each of the two rotor windings occupies the same space, and they have the same effective resistance and that the current through the commutator-winding is almost equal to half current of the working winding. The total copper losses of such a motor are then:

$$r.I^2 + r.(I/2)^2 = 1.25 r.I^2$$

With the new invention, however, the whole space of the slots may be utilized for the commutator-winding. If we assume that the cross-section of the commutator-winding would be merely doubled (really it may be more than doubled because of the reduced insulation) we obtain as the copper losses of the rotor-winding the amount:

$$r/2[I^2 + (I/2)^2] = 0.625 r I^2$$

which is half of that of the former motors.

For all compensated motors of a higher power the necessary voltage of the exciting-winding 35 is less than that obtained in a diametrical-winding. In this case this exciting-winding 35 may consist of windings with a much shortened pitch or if necessary in delta connection.

Having described our invention, what we claim and desire to protect by Letters Patent of the United States is:

1. In a compensated induction motor, comprising a stator, a three phase working winding on said stator, a three phase compensating winding for power factor correction, the rotor being provided with slots, a commutated winding arranged in said slots, a commutator associated with said latter winding, a set of brushes for said commutator and connected to said compensating winding, starting resistances inserted in the connecting leads from said brushes to said compensating winding whereby said commutator winding functions as a compensating winding and as a working winding and short circuit conducting bands surrounding the individual teeth of said rotor for reducing sparking of said commutator and for producing additional mechanical torque of said motor to relieve said commutator winding in its operation as a working winding.

2. In a compensated induction motor, comprising an operating stator winding, a compensating stator winding for supplying compensating current for power factor correction, a commutated rotor winding, a commutator associated with said commutated winding, a set of diametrically arranged pairs of brushes for said commutator, each pair being connected to the terminals of a section of corresponding phase of said compensating winding, whereby said commutated rotor winding simultaneously functions as a compensated rotor winding and as a working rotor winding producing mechanical torque and electric short circuit loops surrounding the rotor teeth bearing said rotor winding to reduce commutator sparking and to simultaneously produce mechanical torque to assist said rotor winding during starting in its operation as a working winding.

3. In a three phase induction motor, comprising a three phase stator operating winding, a further three phase stator compensating winding for supplying compensating current for power factor correction, a commutated rotor winding provided with a commutator, three pairs of diametrically arranged brushes on said commutator spaced by an angle of 120 electrical degrees from each other and connected to the terminals of the section of corresponding phase of said compensating winding, whereby said commutated winding simultaneously functions as a rotor compensating winding and as a working winding by producing mechanical torque and short circuit bands of conducting material surrounding the rotor teeth bearing said commutating winding for reducing commutator sparking and producing mechanical torque to assist said commutator winding in its operation as a working winding.

In testimony whereof they have affixed their signatures.

RUDOLF RICHTER.
DR. FEKETE, ALEXR.